United States Patent [19]

Krempl et al.

[11] 4,404,854
[45] Sep. 20, 1983

[54] TRANSDUCER DEVICE FOR MEASURING MECHANICAL VALUES ON HOLLOW BODIES

[75] Inventors: Peter Krempl, Vienna; Rudolf Zeiringer; Peter Claassen, both of Graz, all of Austria

[73] Assignee: Hans List, Graz, Austria

[21] Appl. No.: 273,685

[22] Filed: Jun. 15, 1981

[30] Foreign Application Priority Data

Jun. 16, 1980 [AT] Austria .................................. 3178/80

[51] Int. Cl.³ .............................................. G01L 9/06
[52] U.S. Cl. ................................ 73/730; 73/DIG. 4; 73/119 A; 338/4
[58] Field of Search ............ 73/730, 119 A, DIG. 4; 338/4

[56] References Cited
U.S. PATENT DOCUMENTS
4,027,536 6/1977 Heggie ................................ 73/730

Primary Examiner—Donald O. Woodiel
Attorney, Agent, or Firm—Watson, Cole, Grindle & Watson

[57] ABSTRACT

A transducer device for measuring mechanical values on hollow bodies, such as the internal pressure in pipes, by detecting deformation in the outer surface thereof, comprises a housing for removably enclosing the hollow body whose outer surface deformation is to be measured and at least one elastic sensor element which is capable of being elastically and at least indirectly pressed against the outer surface of the hollow body by an elastic endorsing element and capable of stretching due to the deformation of the hollow body due to frictional contact therewith. The endorsing element is combined with the sensor element and/or at least a part of the housing into one piece, whereby manufacture and adjustment of the transducer device are simplified.

9 Claims, 8 Drawing Figures

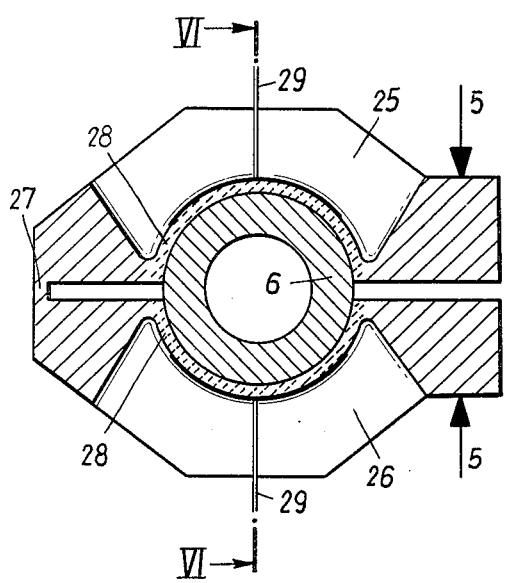
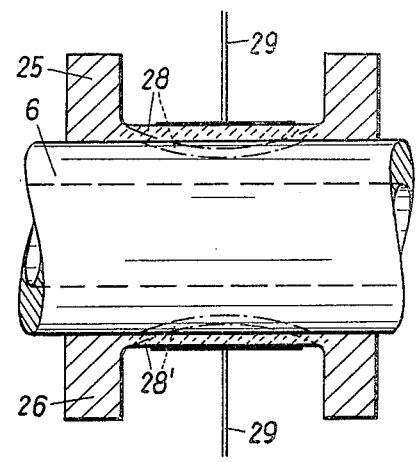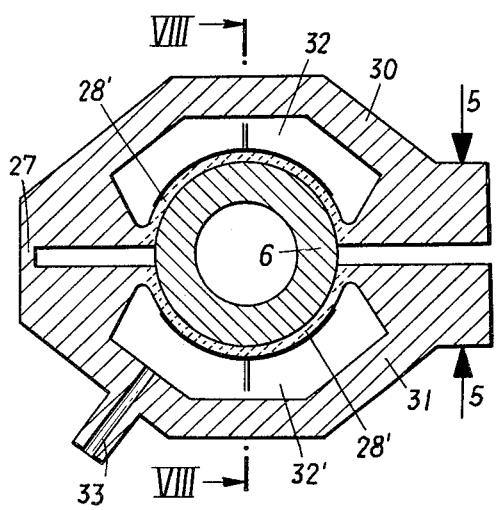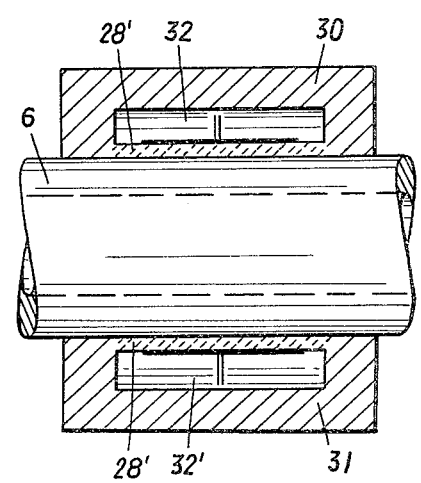

TRANSDUCER DEVICE FOR MEASURING MECHANICAL VALUES ON HOLLOW BODIES

BACKGROUND OF THE INVENTION

The present invention relates to a transducer device for measuring mechanical values on hollow bodies, such as the internal pressure in pipes, by detecting deformations in the outer surface thereof, comprising a housing for removably enclosing the hollow body whose outer surface deformation is to be measured and at least one elastic sensor element being elastically and at least indirectly pressed against the outer surface of said hollow body by an elastic endorsing element and capable of stretching due to the deformation of said hollow body due to frictional contact therewith and is connected to the necessary leads for transmission of the measuring signals.

DESCRIPTION OF THE PRIOR ART

In principle, transducers of this type, known, e.g., from U.S. Pat. No. 4,194,401, are based on the friction-mediated transmission of the outer surface expansions of the hollow body to be measured to the sensor element, which is pressed against this surface by an elastic support in an essentially normal direction. Due to the multilayer design necessitated by this principle manufacture and installation of this known type of transducer are relatively complicated, requiring adjustment of the various layers with respect to each other. While particularly difficult, the exact positioning of the sensor elements within the housing is of primary importance, as, e.g., only exact counter-positioning of a pair of sensor elements will ensure good acceleration compensation or good compensation of noise signals caused by surface deformations due to the bending of a pipe subject to vibrations. Further difficulties may arise due to differences in material from the connection between sensor element and endorsing element. The leads carrying the measuring signals from the sensor element to the outside of the transducer housing will have to cross the elastic endorsing element which may be strongly deformed in the course of mounting the transducer, thus adding to the complexity of the overall design of the transducer and increasing manufacturing and installation costs.

SUMMARY OF THE INVENTION

It is an object of the present invention to design transducers of the aforementioned type in such a way as to avoid the indicated disadvantages of the known types and to simplify manufacture, installation and adjustment of the transducer.

The present invention achieves this by combining the elastic endorsing element with the sensor element and/or at least a part of the housing into one piece. This integration of at least two of the three functional elements of the transducer device (i.e. housing, elastic endorsing element, sensor element) entails a significant simplification of the design, installation and adjustment of the transducer device and of its parts, respectively.

The sensor element may be made of an elastic material which is at least locally sensitive to measuring, and may be integrated with the endorsing element to form one part. Positioning of this combined element in the housing as well as placing and connecting the leads carrying the measuring signals thus is made much simpler than before.

In this context it is of particular advantage for the sensor element including the elastic endorsing element to form a single part together with the housing, especially if a piezoelectric or piezoresistive material is used for the manufacture of the sensor element. For instance, the use of a piezoelectric elastic rubber or plastic material will permit direct moulding of the sensor and endorsing elements in one piece. The necessary leads for transmitting the electric measuring signals, which are attached to opposing surfaces of the sensor element when using a piezoelectric or piezoresistive material, may be attached to the housing by a simple rigid connection on one side, while the surface of the hollow body itself or a suitable contact layer may be used for conveying the signal on the other side where the sensor element is in direct contact with the hollow body to be measured. If housing, endorsing element and sensor element are fully integrated into one piece, a grid-shaped electrode or a similar structure, necessary to make the part of the sensor element contacting the surface of the hollow body sensitive to measuring by means of electrical polarization, may be formed together with the housing by an injection moulding technique. While the one-piece transducer as a whole is hard-moulded, softeners may be added to that area corresponding to the sensor element and endorsing element. This will help to achieve the elastic pressure of the sensor element against the surface of the hollow body to be measured, which is required for friction-mediated signal transmission. On the other hand the same effect may be achieved by the use of a soft or elastic plastic or rubber material and the addition of hardeners to the exterior regions or those regions which constitute the clamp fastening the transducer to the hollow body. The grid-shaped electrode which is required for the sensor element to be electrically polarized and thus to be endowed with the desired piezoelectric or piezoresistive characteristics can be moulded in and may directly be used as a lead for one pole of the sensor element in the finished transducer device.

Carrying the present invention further, either part of the housing is provided with at least one area of reduced wall thickness which in the mounted state of the transducer device is deformed by the outer surface of the hollow body and forms the combined sensor/endorsing element which is at least locally sensitive. This will provide the elasticity of the endorsing element aimed at by the present invention, not via the elastic properties of the material itself but rather by means of the design of the transducer and the transducer housing, respectively. Together with a wider choice in the positioning of the leads carrying the measuring signals, this will result in greater freedom in shaping the transducer.

In accordance with another feature, a hermetically sealed chamber is provided between endorsing element and housing, or between sensor element and housing, which is filled with a pressurized medium. This is practically equivalent to an additional endorsing element. Under certain circumstances proper location of this pressurized space may even eliminate the need for an endorsing element in the strict sense of the word.

A further feature of the invention includes pressurizing the hermetically sealed chamber in the housing from an outside pressure source, which would permit regulation of the contact pressure of the sensor element.

DESCRIPTION OF THE DRAWINGS

Following is a more detailed description of exemplary embodiments of the invention, as illustrated by the enclosed drawings, wherein FIG. 5 is a schematic view similar to FIG. 1 of yet another embodiment of this invention, FIG. 6 is a sectional view taken along line VI—VI of FIG. 5, FIG. 7 is a view similar to FIG. 1 of still further embodiments of the present invention shown at the upper and lower halves in this Figure, and FIG. 8 is a sectional view taken along line VIII—VIII in FIG. 7.

A housing 1 of a transducer device shown in FIGS. 1 and 2 is made of plastic, comprises two housing parts 2, 3 connected by a plastic hinge 4, and is made in one piece, e.g., by injection moulding. The transducer device is mounted on a pipe 6 by means of a gripping device indicated symbolically by arrows 5. As shown in FIG. 2, lateral parts 7 and 8 of the housing grip the pipe 6 tightly, thus ensuring that any movement of the pipe 6 is imparted to the transducer housing 1 without delay. Each of the housing parts 2, 3 contains a sensor element 9, 10 comprising a piezoelectric or piezoresistive elastic material and is pressed against the surface of pipe 6 when the transducer device is mounted on the pipe.

Figure 1:
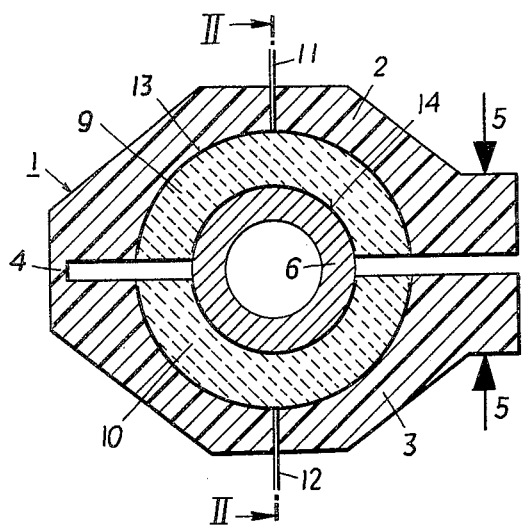
FIG. 1 is a schematic, cross-sectional view of a transducer in accordance with the present invention.

In this way deformations of the surface of the pipe 6 caused by internal pressure changes are transmitted by friction to the sensor elements 9, 10. Due to their piezosensitivity the sensor elements 9, 10 transform deformation forces acting upon them into corresponding electric signals proportional to the deformations causing them. The signals are conveyed by schematically indicated leads 11, 12 to an evaluation device (not shown in the drawing). In the piezoelectric transducer shown the outer pole of the sensor elements 9, 10 is connected to the respective lead 11, 12 by means of an electrically conductive contact layer which may be formed, e.g., by a vacuum evaporation technique. The inner pole of the sensor elements 9, 10 may be connected to a further lead (not shown in the drawing), via another contact layer 14, or—if the pipe 6 has an electrically conductive surface—it may be directly connected to the pipe 6.

In this variant the sensor element and the elastic endorsing element necessary to press the former against the surface to be measured, have been integrated into one piece, which will greatly simplify manufacture, installation and adjustment of the transducer device. For the compensation of noise signals due to bending vibrations or vibration accelerations of the pipe 6, it is, e.g., necessary that the equivalent sensor elements 9 and 10 be situated exactly opposite each other in the housing 1. In the one-piece configuration this can be achieved by a single adjustment process. If the pipe 6 is used directly as a lead for the inner pole of the sensor element, transmission of the measuring signals is also made much simpler as the lead for the outer pole may be rigidly connected to the housing and the elastic deformation of the endorsing element need not be taken into account.

Figure 3:
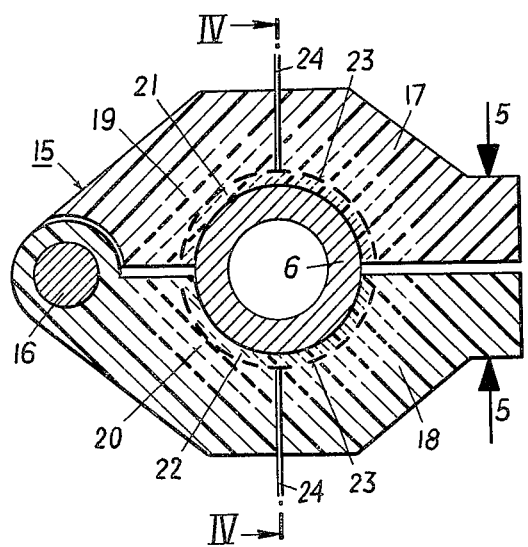
FIG. 3 is a view similar to FIG. 1 of another embodiment of the invention.
Figure 4:
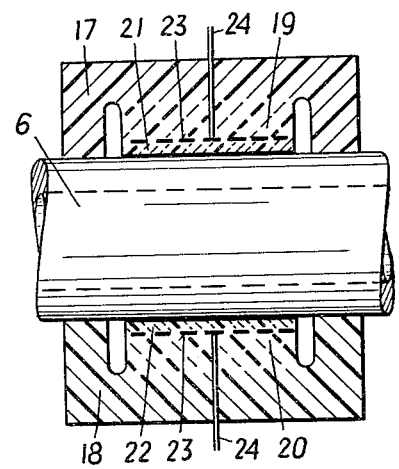
FIG. 4 is a sectional view taken along line IV—IV of FIG. 3.

The transducer device shown in FIGS. 3 and 4 has a housing 15, comprising two parts 17, 18, which are hinged by a bolt 16 and mounted on a pipe 6 with a gripping device opposite bolt 16, which is again indicated by the arrows 5 only.

Figure 2:
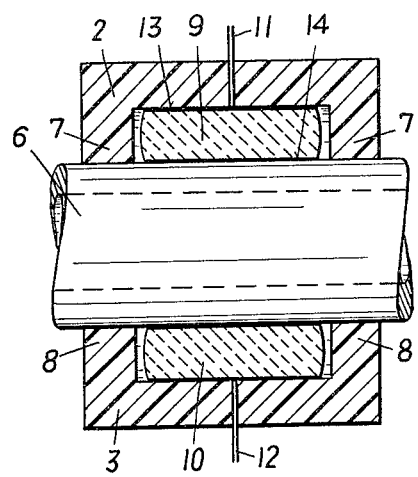
FIG. 2 is a sectional view taken along line II—II of FIG. 1.

In this variant of the invention parts 17, 18 of the housing, the elastic endorsing elements 19, 20 and the sensor elements 21, 22 are integrated into one piece. When injection moulding parts 17, 18 from a hard-curing plastic, the elasticity necessary for the friction-mediated transmission of surface deformations of the pipe can be provided by adding a softener to the material injected into the inner area of parts 17 and 18, which corresponds to the combined endorsing/sensor element of the variant depicted in FIGS. 1 and 2. On the other hand, it is possible to use a soft-curing plastic as a base material, and to impart the necessary rigidity to the outer parts of the housing by adding a hardener during the injection process.

Polarisation and sensitization of the innermost parts of the housing 17, 18 which, when mounted, will be in contact with the pipe, is achieved by incorporating an electrically conductive grid 23 which is connected to leads 24 (shown schematically only). In the finished transducer device this grid 23, together with the leads 24, may be directly used to electrically connect the outer poles of the sensor elements 21, 22. The inner pole of each of the sensor elements may be connected directly via pipe 6, or by way of separately applied contact layers, as discussed above. Above all, this variant deserves attention because of the elimination of all installation and adjustment activities for the sensor and endorsing elements, which will not only simplify manufacture but will also guarantee high reliability of the transducer device.

The transducer device shown in FIGS. 5 and 6 again comprises two housing parts 25, 26 joined by a bridge 27 of reduced thickness. Each of these parts 25, 26 is provided with another area 28 of reduced thickness representing the—at least locally—sensitive combined sensor/endorsing element, which is deformed by the surface of the pipe when the transducer device is mounted on the pipe 6. The phantom lines in FIG. 6 show the shape of this area 28, representing sensor and endorsing element in the absence of the pipe 6. In this case the elasticity of the endorsing element necessary to press the sensor element against the surface of the hollow body to be measured, is provided not so much by the elasticity of the material proper, but by the configuration of the transducer device or of the parts 25, 26, which may permit a greater range of materials to be taken into consideration.

Electrical connections 29 for the measuring signals are only schematically presented in this Figure and may be established by any of the methods discussed above.

The embodiment of the invention as shown in FIGS. 7 and 8 is analogous to the variant shown in FIGS. 5 and 6 with regard to the placement and shape of area 28' acting as a sensor element and thin-walled endorsing element. Again, the two housing parts 30 and 31 are joined by a bridge 27 of reduced thickness, which—being in one piece with the housing—acts as a hinge, and may be mounted on pipe 6 by means of a gripping device indicated by arrows 5. The electrical connections 29 for the measuring signals are only shown schematically and might be established in various other ways.

Between the endorsing/sensor element or the area 28' representing both these elements and the housing parts 30 and 31, a hermetically sealed chamber 32 or 32' is provided, which is filled with a pressurized medium, e.g., air, gas, oil or the like. The upper part of FIG. 7 shows a variant in which the hermetically sealed chamber 32 is filled with the pressurized medium at the time of manufacture of the transducer, while the lower part of FIG. 7 shows a variant in which the pressure of the pressure chamber 32' may be varied by means of a nipple 33 provided for a pressurizing pump (not shown). Thus the force pressing the sensor element against the pipe surface may be adjusted at a later time, e.g., after the transducer device has been mounted on the pipe 6.

I claim:

1. A transducer device for measuring mechanical values on hollow bodies, such as the internal pressure in pipes, by detecting deformations at the outer surface thereof, comprising a removable housing for removably enclosing the hollow body whose outer surface deformation is to be measured, said housing comprising an elastic endorsing element, and at least one elastic sensor member being elastically pressed against the outer surface of said hollow body by said elastic endorsing element said member being capable of stretching due to the deformation of said hollow body due to the frictional contact therewith, and wherein said endorsing element and said sensor element are of one-piece construction.

2. A transducer device according to claim 1, wherein either part of said housing is provided with at least one area of reduced wall thickness, which is capable of being deformed by the outer surface of said hollow body and forms the one-piece sensor/endorsing element construction which is at least locally sensitive.

3. A transducer device according to claim 2, wherein a hermetically sealed chamber is provided between said sensor/endorsing element and said housing, which is filled with a pressurized medium.

4. A transducer device according to claim 3, wherein said hermetically sealed chamber is capable of being pressurized from an outside pressure source.

5. A transducer device according to claim 1, wherein said elastic sensor member includes an electrically conductive inner contact layer in direct frictional contact with said hollow body and has a bi-polar signal take-off via said housing.

6. A transducer device for measuring mechanical values on hollow bodies, such as the internal pressure in pipes, by detecting deformations at the outer surface thereof, comprising a removable housing for removably enclosing the hollow body whose outer surface deformation is to be measured, said housing comprising an elastic endorsing element, and at least one elastic sensor member being elastically pressed against the outer surface of said hollow body by said elastic endorsing element, said member being capable of stretching due to the deformation of said hollow body due to the frictional contact therewith, and wherein said endorsing element and at lesat a part of said housing are of one-piece construction.

7. A transducer device according to claim 6, wherein said elastic sensor member includes an electrically conductive inner contact layer in direct frictional contact with said hollow body and has a bi-polar signal take-off via said housing.

8. A transducer device for measuring mechanical values on hollow bodies, such as the internal pressure in pipes, by detecting deformations at the outer surface thereof, comprising a removable housing for removably enclosing the hollow body whose outer surface deformation is to be measured, said housing comprising an elastic endorsing element, and at least one elastic sensor member being elastically pressed against the outer surface of said hollow body by said elastic endorsing element said member being capable of stretching due to the deformation of said hollow body due to the frictional contact therewith, and wherein said endorsing element, said sensor element and at least a part of said housing are of one-piece construction.

9. A transducer device according to claim 8, wherein said elastic sensor member includes an electrically conductive inner contact layer in direct frictional contact with said hollow body and has a bi-polar signal take-off via said housing.

* * * * *